United States Patent [19]

Gaiardo

[11] Patent Number: 5,048,564
[45] Date of Patent: Sep. 17, 1991

[54] HIGH-SPEED SOLENOID VALVE FOR A FLUID UNDER PRESSURE, E.G. FOR PNEUMATIC CIRCUITS

[75] Inventor: Mario Gaiardo, Ivrea, Italy
[73] Assignee: Matrix S.r.L., Ivrea, Italy
[21] Appl. No.: 530,348
[22] Filed: May 30, 1990

[30] Foreign Application Priority Data

Jun. 2, 1989 [IT] Italy .............................. 67429 A/89
Jun. 2, 1989 [IT] Italy .............................. 67430 A/89

[51] Int. Cl.$^5$ ..................... F16K 31/06; F16K 11/24
[52] U.S. Cl. .................................... 137/599; 137/883; 251/129.2; 251/129.22; 251/129.16
[58] Field of Search ............ 251/129.2, 129.22, 129.16

[56] References Cited

U.S. PATENT DOCUMENTS

| | | | |
|---|---|---|---|
| 1,403,930 | 1/1922 | Wick | 251/129.2 X |
| 2,844,768 | 7/1958 | Hilgert | 251/129.2 X |
| 3,502,105 | 3/1970 | Ernyei et al. | |
| 3,528,639 | 9/1970 | Grayson | |
| 4,019,533 | 4/1977 | Jerde et al. | |
| 4,561,631 | 12/1985 | Slavin et al | 251/129.22 X |
| 4,905,962 | 3/1990 | Iijin | 251/129.16 |

FOREIGN PATENT DOCUMENTS 435394 4/1971 Australia .
1531234 7/1967 France .

Primary Examiner—Arnold Rosenthal
Attorney, Agent, or Firm—Michael N. Meller

[57] ABSTRACT

A solenoid valve having an electromagnet arranged in a chamber into which an inlet duct and an outlet duct of the solenoid valve open, whereby the coil is constantly ventilated by the compressed air itself. The armature of the electromagnetic has a disc for shutting off the outlet duct and is formed by a plate which is urged into the closed position of the solenoid valve by the compressed air. The plate rotates about a beading of elastomeric material and exhibits extremely low inertia, whereby the solenoid valve can be operated at high frequency. The chamber can house a plurality of electromagnets, each of which controls a shut-off member for a corresponding outlet duct. The body also comprises an interchangeable shell which has funnel-shaped chambers for directing the air of at least one set of ducts to a common outlet aperture.

18 Claims, 6 Drawing Sheets

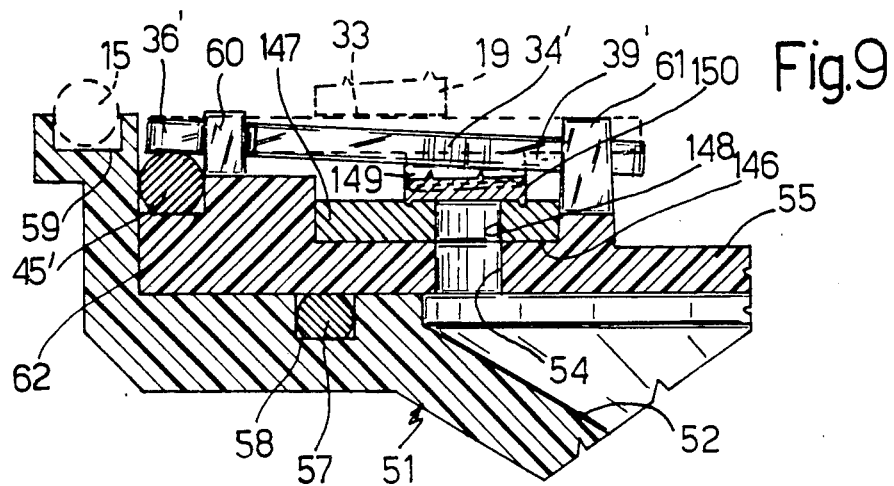
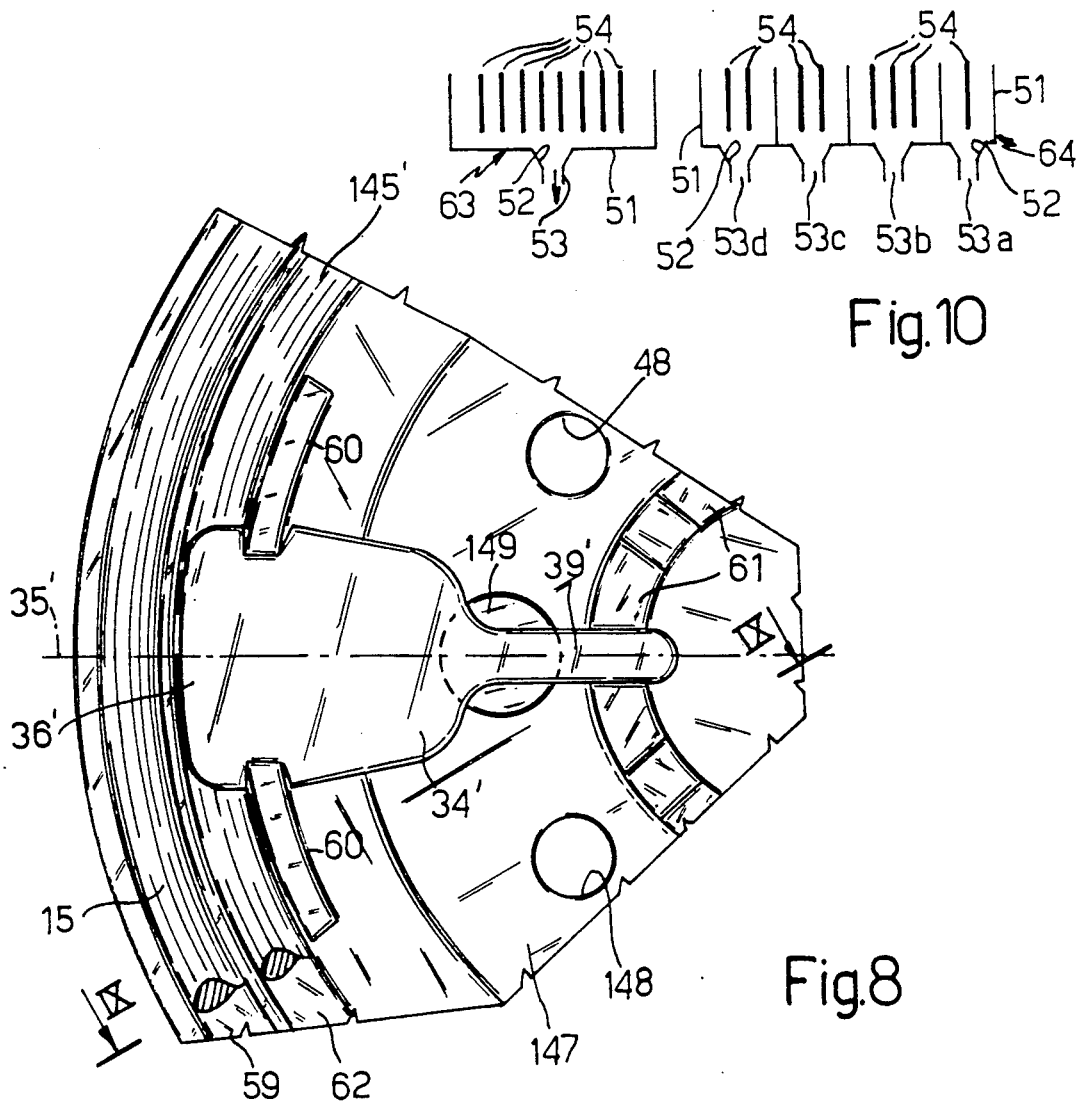

HIGH-SPEED SOLENOID VALVE FOR A FLUID UNDER PRESSURE, E.G. FOR PNEUMATIC CIRCUITS

BACKGROUND OF THE INVENTION

The present invention relates to a high-speed solenoid valve for a fluid under pressure, e.g. for pneumatic circuits, comprising an inlet duct for the fluid, at least one outlet duct for the fluid, a shut-off member for the fluid in said outlet duct, and an electromagnet for controlling said shut-off member.

In known solenoid valves the shut-off member is generally movable in a slide member, in which it can adopt either of two positions corresponding to the opening and closing of the solenoid valve. In one known type of solenoid valve, the shut-off member is moved into one of the two positions by means of the controlling electromagnet and is returned into the other position by means of a spring.

Solenoid valves of this type have the disadvantage of requiring a relatively long time to operate, whereby they allow neither a high switching speed nor a high control frequency nor high control repetition rate. In fact, upon each operation the electromagnet has to overcome the resilience of the spring, it being necessary for the latter to be able to arrest the slide member. Moreover, upon repeated actuation, these solenoid valves are subject to overheating as a result of the electric current in the coil of the electromagnet.

SUMMARY OF THE INVENTION

It is the object of the present invention to devise a solenoid valve which not only exhibits a high degree of simplicity and operational reliability but also obviates the disadvantages present in the above-mentioned solenoid valves of known type.

This object is achieved by the solenoid valve according to the invention, which is characterized in that the control electromagnet is arranged in a chamber in the body of the solenoid valve, into which said inlet duct and said outlet duct open, whereby both the electric coil and the magnetic circuit of the electromagnet are constantly acted upon by fluid under pressure.

According to another feature of the invention said body is provided with a plurality of said outlet apertures associated with a plurality of said shut-off members, said chamber housing a plurality of said electromagnets associated with said shut-off members and energizable individually or in combination to operate the associated shut-off members.

BRIEF DESCRIPTION OF THE DRAWINGS

With a view to a better understanding of the features and advantages of the invention, some preferred embodiments will be described below non-restrictively by way of example, with reference to the accompanying drawings, wherein:

FIG. 8 is a section taken along the line VIII—VIII in FIG. 7;

FIG. 9 is a section taken along the line IX—IX in FIG. 8;

FIG. 10 represents various configurations of the member of the outlet ducts of the solenoid valve in FIG. 7.

DETAILED DESCRIPTION OF THE INVENTION

Figure 1:
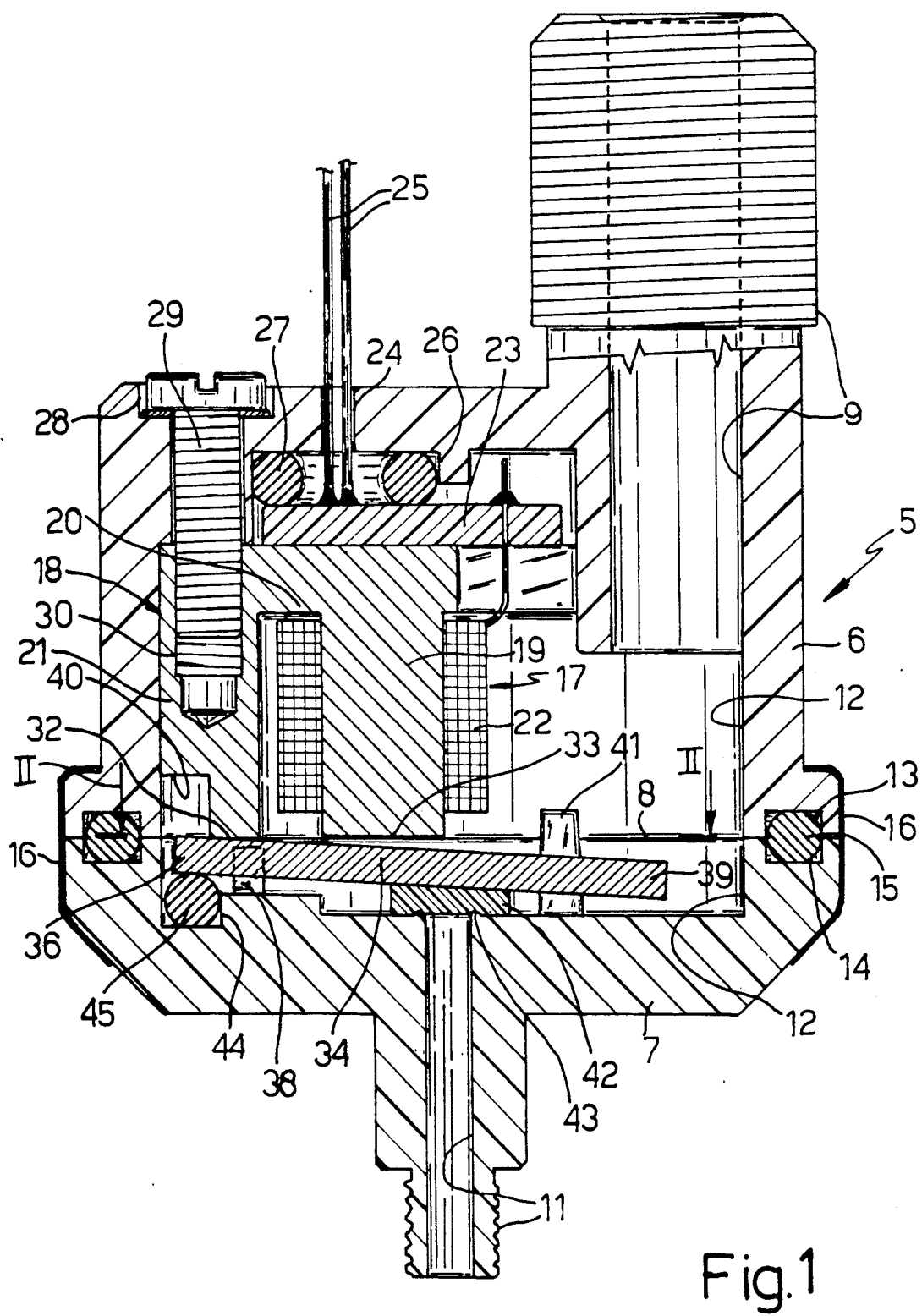
FIG. 1 is a cross section through a high-speed single outlet solenoid valve for a pneumatic circuit, in accordance with a first embodiment of the invention.

Referring now to FIG. 1, the solenoid valve comprises a body 5 of non-magnetic material, for example a light metal alloy. The body 5 is of circular section and comprises a pair of members 6 and 7 which fit together along a diametral plane 8. The member 6 is integral with an inlet duct 9 whose axis is parallel to that of the body 5 but offset relative thereto. One end of the duct 9 is threaded for connection with a compressed-air circuit, supplied from a reservoir or a compressor. The member 7 is integral with an outlet duct 11 which is coaxial with the body 5 and has a threaded end for connection to an appliance using the compressed air. The two members 6 and 7 enclose in a fluid-tight manner a chamber 12 of circular section, into which the two ducts 9 and 11 open. In particular, the two members 6 and 7 are each provided on their respective rims with channels 13 and 14, in which a gasket or sealing ring 15 is inserted. The two members 6 and 7 are clamped together by means of spring clips 16 to effect a connection and slightly compress the ring 15.

The solenoid valve comprises an electromagnet generally designated 17, the magnetic circuit of which comprises a block 18 formed by a cylindrical core 19 which is integral with a cross-piece 20 and with annular segmental portion 21. The conventional electric coil 22 of the electromagnet is wound around the core 19 and its terminals are soldered to a printed circuit board 23 which can be adhered to the block 18 of the magnetic circuit.

On its flat wall the member 6 is provided with a hole 24 through which exit two electric leads 25, said leads being connected electrically on the board 23 to the terminals of the coil 22. Concentrically with the hole 24 the member 6 is provided internally with a circular recess 26, in which a seal 27 is inserted between the board 23 and the flat wall of the member 6 so as to register with the hole 24.

Finally, the member 6 is provided with a recess 28 for a screw 29 which is intended to engage in a threaded hole 30 of the portion 21 so as to secure the electromagnet 17 to the member 6. For this purpose, the member 6 is provided internally with a support shoulder 31 for the electromagnet 17, arranged in such a way that the flat surface of the core 19 and an edge 32 of the portion 21 of the block 18 are situated on the diametral plane 8 of the body 5. A layer 33 of non-magnetic material is fastened to the flat surface of the core 19, said material comprising, for example, a sheet of plastics material known under the trade name "MYLAR" or "KAPTON" (registered trademarks), for the purpose of creating a minimum air gap in the magnetic circuit. Lastly, the magnetic circuit comprises an armature of magnetic material, which comprises a plate 34 able to abut against the edge 32 of the portion 21 and against the layer 33. The plate 34 is of symmetrical shape in relation to a plane indicated by the reference numeral 35 in FIG. 2 and it is provided, in the vicinity of an edge 36, with two notches 37 which are symmetrical in relation to the plane 35. The notches 37 are engaged, with a certain amount of clearance, by a pair of projections 38 formed integrally with the member 7. The plate 34 is additionally provided with a slender projection 39 of elongate form disposed along the plane of symmetry 35. During its vertical movement, the projection 39 is guided by a second pair of projections 41 formed integrally with the member 7.

A disc 42 of elastomeric material, for example silicone rubber, is fastened (vulcanized, for example) to the lower surface of the plate 34 facing towards the outlet duct 11 (FIG. 1), said disc being able to engage the mouth of the outlet duct 11. In particular, said mouth is formed with an annular projection 43, whereas the disc 42 is of wedge-shaped section so as to adhere perfectly to the inner surface of the member 7 adjoining the projecting 43, when the coil 22 is de-energized, as shown in FIG. 1.

Finally, the member 7 is provided with an arcuate groove 44 which accommodates a pivot member 45 of circular section which, therefore, is perpendicular to the axis of the outlet duct 11. The member 45 comprises a beading of elastomeric material, against which the edge 36 of the plate 34 is normally applied so as to prevent the latter from being applied against the inner surface of the member 7.

In register with the groove 44 the portion 21 of the magnetic block 18 has an undercut 40 so as to allow the edge 36 of the plate 34 to pivot freely. The edge 32 of the portion 21 normally acts on the plate 34 so as to deform the beading 45 slightly, whereby the latter forms with the edge 32 the pivot for the plate 34.

When the solenoid valve 5 is connected in the pneumatic circuit, the compressed air enters through the duct 9, maintains the chamber 12 under pressure and acts on the plate 34 so as to induce the disc 42 to seal against the mouth of the duct 11, thereby keeping the solenoid valve automatically closed, as indicated in FIG. 1.

When the electromagnet 17 is energized, the core 19 attracts the plate 34 which pivots upwards about the beading 45 and bears against the layer of Mylar 33. The solenoid valve is thus opened and the flow of air under pressure entering via the duct 9 flows around the coil 22 and leaves via the duct 11. Therefore, the coil 22 is automatically ventilated even if it is subject to protracted or frequent energizing. Because the ducts 9 and 11 are offset, the flow of air creates a vortex which induces the ventilation of the coil 22 to be particularly effective, whereby its temperature is always maintained at values which are close to the temperature of the compresssed air itself. When the coil 22 ceases to be energized, both the compressed air and the elastic force of the beading 45 assist in detaching the plate 34 from the core 19, whereupon the solenoid valve is rapidly closed without the aid of return means or forces.

Moreover, it is evident from the foregoing that the shape of the plate 34 with its slender projection 39 reduces the mass thereof to a minimum. Therefore, the moving element of the solenoid valve, comprising the plate 34 and the disc 42, exhibits extremely low inertia and requires a low power electromagnet, whereby the solenoid valve has extremely short response times and can be operated at high frequency.

Figure 3:
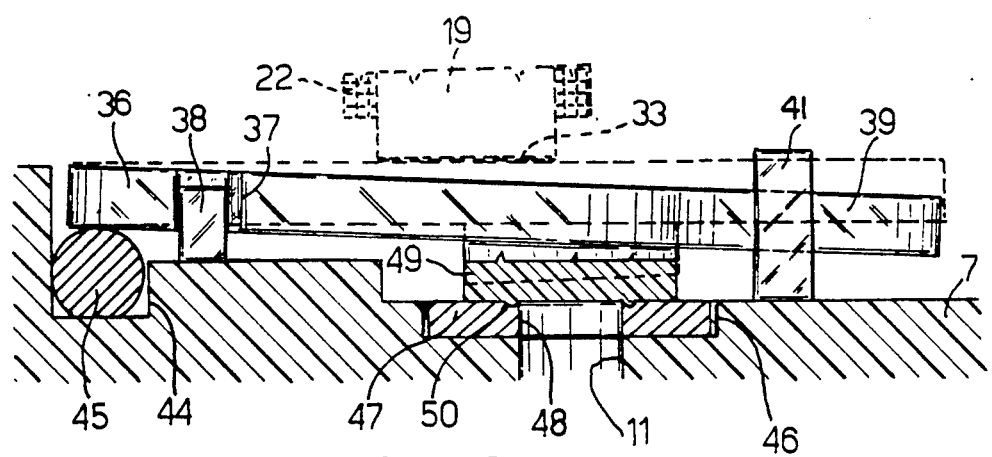
FIG. 3 is a part of the section in FIG. 1 on an enlarged scale, incorporating a variant of the solenoid valve.

According to the variant of FIG. 3, the mouth of the outlet duct 11 in the member 7 has a circular recess 46, in which is inserted a ring-shaped seal 47 of elastomeric material. The seal 47 is provided with a hole 48 of a diameter substantially equal to that of the duct 11. For its part, the plate 34 has a metal disc 49 which is formed integrally therewith or welded thereto and which is provided with an annular projection 50 of larger diameter than that of the hole 48.

When the coil 22 is de-energized, the plate 34 moves from the position indicated by dashed lines in FIG. 3 into the position indicated by solid lines. It thus induces the disc 49 to be applied against the seal 47 and, by means of the projection 50, causes the seal to deform concentrically around the hole 48, thereby fluid-tightly closing the outlet duct 11 and, therefore, the solenoid valve.

In the embodiments of FIGS. 4–9, the individual elements which are like or similar to those of FIG. 1 are designated by the same reference numerals as the elements in FIG. 1 and the associated description will not be repeated here.

Figure 4:
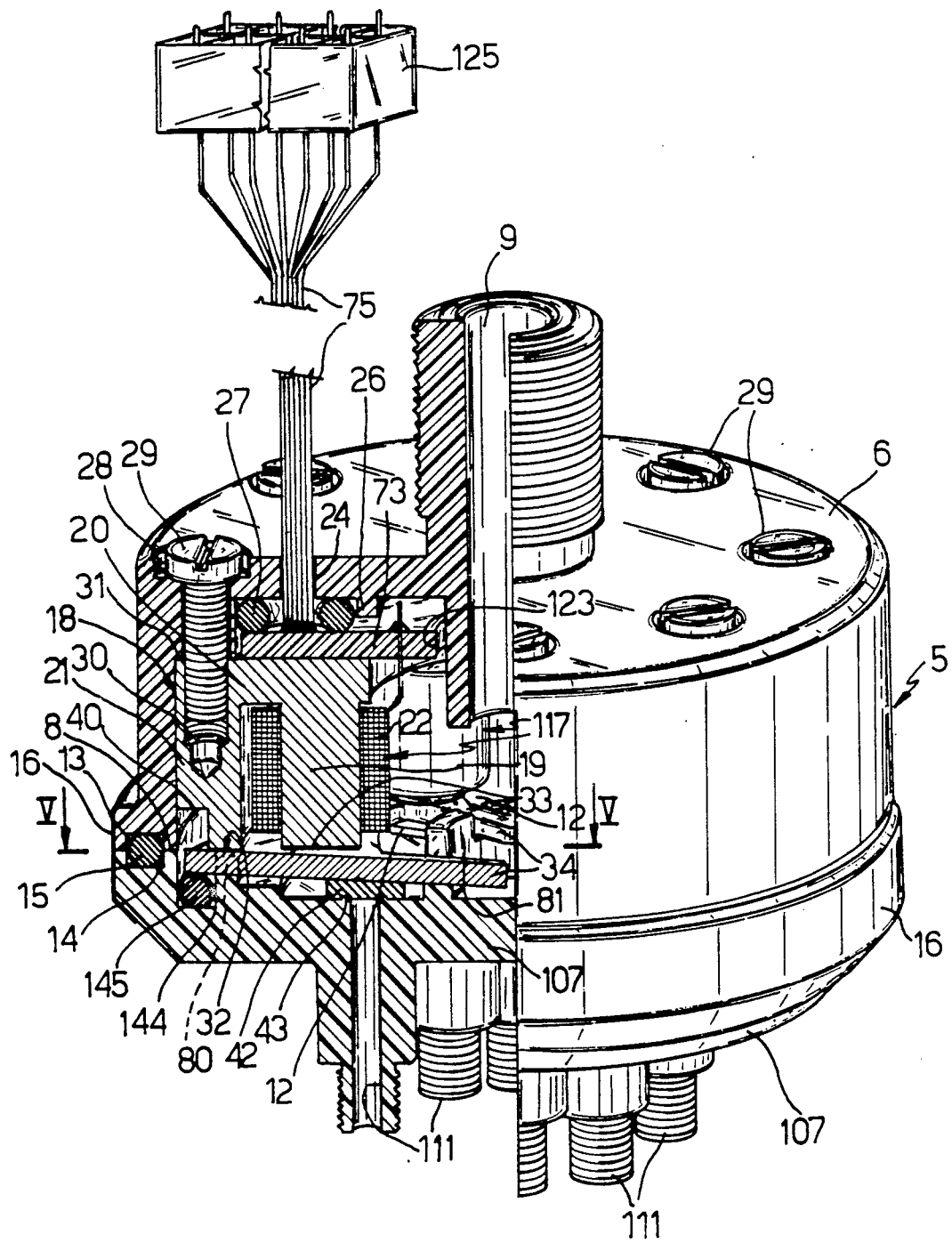
FIG. 4 is a view in perspective, partly in section, of a multiple outlet solenoid valve in accordance with a second embodiment of the invention.

Referring now to FIG. 4, the body 5 includes a chamber 12, which is of circular section and is formed by the upper member 6 integral with the inlet duct 9 coaxial therewith, and by a lower member 107 integral with a plurality of outlet ducts 111, which in the case of FIG. 1 are eight in number. The ducts 111 are similar to one another and their axes are parallel to the axis of the body 5 and disposed on a circle coaxial with the chamber 12. Furthermore, each duct 111 has a threaded end for connection to a corresponding appliance using the compressed air.

The solenoid valve of FIG. 4 comprises a plurality of electromagnets 117 associated with the outlet ducts 111, each electromagnet 117 being similar to the electromagnet 17 of FIG. 1 and being secured to the member 6 by an associated screw 29. The electric coil 22 of each electromagnet 117 comprises a pair of terminals soldered to a single printed circuit board 73, which has a central hole 123 for the passage of the inlet duct 9.

A plurality of pairs of electrical leads 75 are also connected via the printed circuit board 73 to a pair of terminals of the coils 22. The leads 75 are grouped together in a bundle which exits form the flat wall of the member 6 through the single hole 24. Furthermore, the leads 75 are fixed to a single connector 125 outside the body 5.

Each electromagnet 117 comprises an armature formed by a plate 34. The various plates 34 are substantially coplanar with one another and are disposed radially about the axis of the body 5. The notches 37 (FIG. 5) of the plate 34 are engaged, with a certain amount of clearance, by a pair of arcuate projections 80 formed integrally with the member 107.

Each plate 34 is additionally provided with a slender projection 39 of elongate form disposed along the plane of symmetry 35. During its vertical movement, the projection 39 is guided by a second pair of projections 81 which are formed integrally with the member 107, are also arcuate and are each in engagement with the projections 39 of two adjacent plates 34. A radial rib 141 extends from each projection 81 and defines a trough 142 (FIG. 5) in register with each duct 111.

Figure 2:
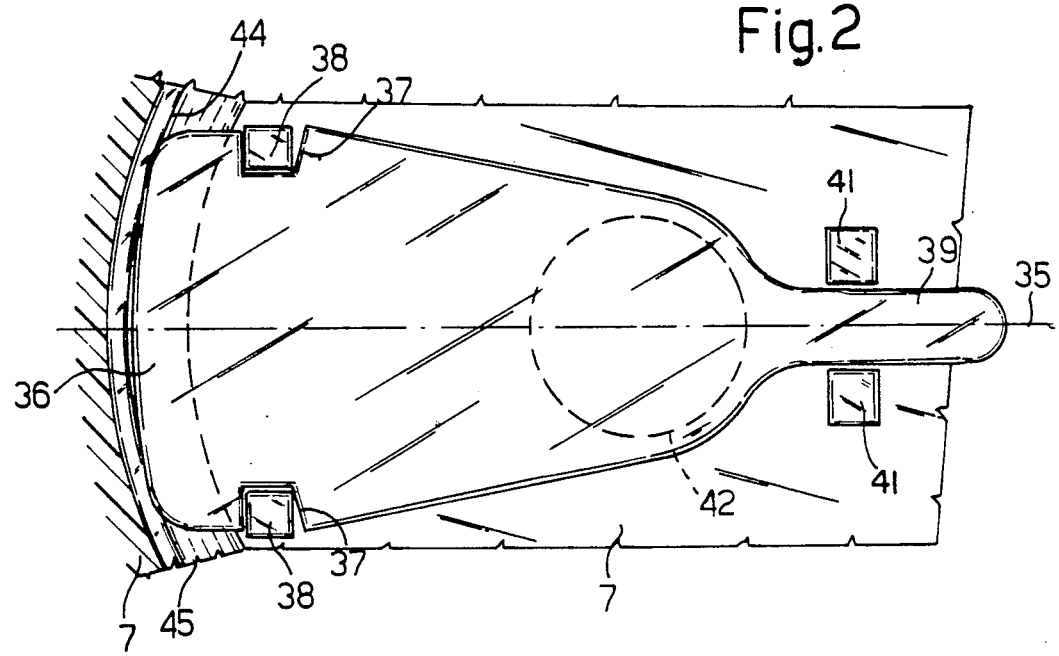
FIG. 2 is a sectional plan view of a detail of the solenoid valve on an enlarged scale, taken along the line II—II in FIG. 1.

The disc 42 of elastomeric material adhering to the lower surface of each plate 34 (FIGS. 4,6) engages the mouth of the corresponding outlet duct 111 formed with the annular projection 43, whereas the disc 42 is of wedge-shaped section as the one shown in FIGS. 1 and 2.

Finally, the member 107 is provided with an annular groove 144 (FIG. 5) which accommodates a pivot member 145 of circular section which, therefore, is perpendicular to the axis of the outlet duct 111. The member 145 comprises a ringe of elastomeric material, against which the edges 36 of the various plates 34 are normally applied as the one of FIG. 1.

Figure 6:
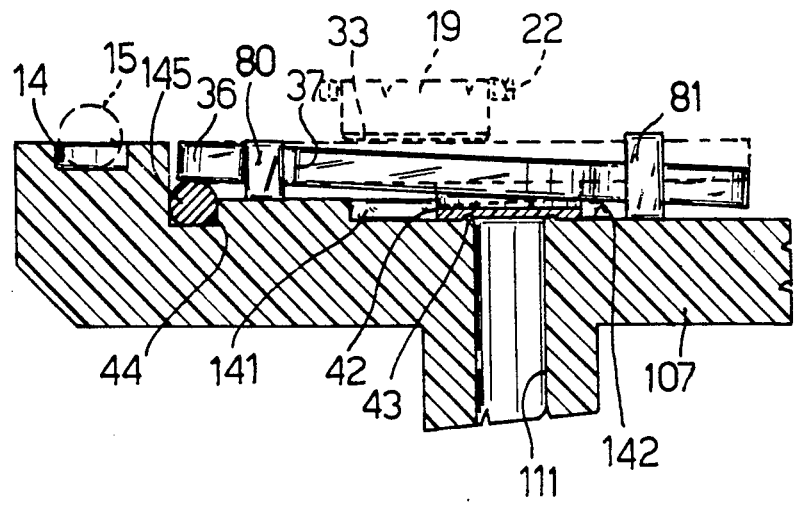
FIG. 6 is a section taken along the line VI—VI in FIG. 5.
Figure 5:
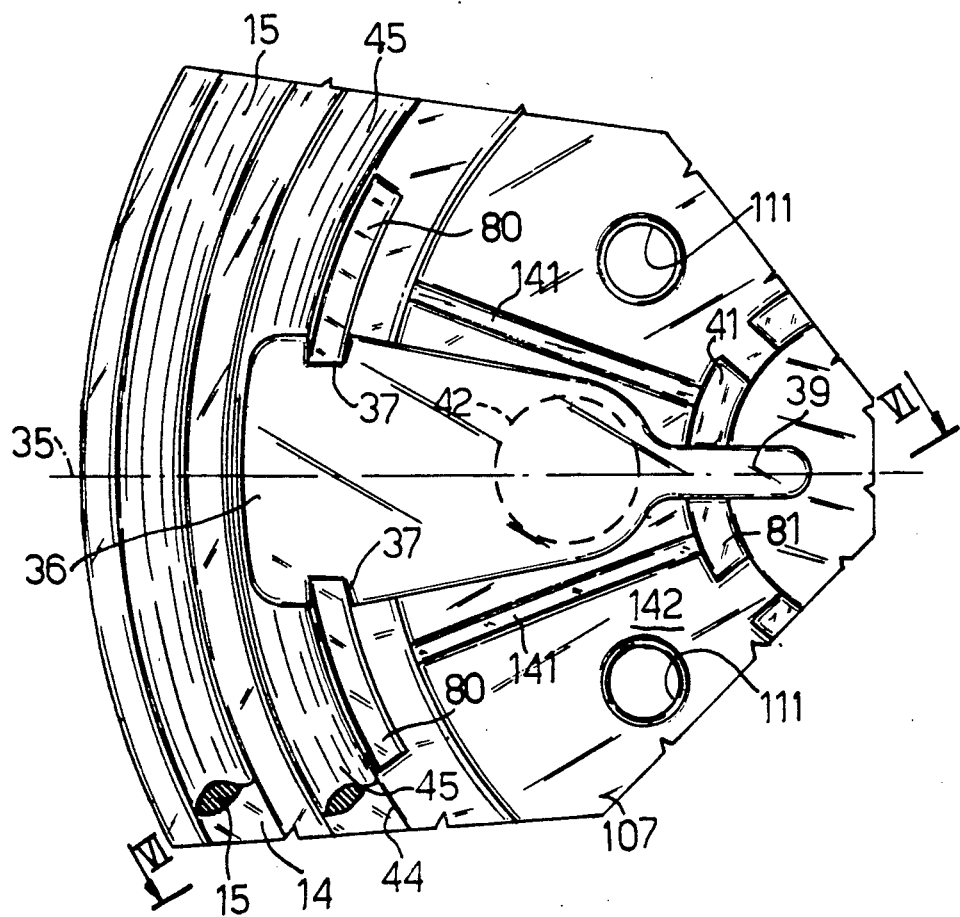
FIG. 5 is a partial section, on an enlarged scale, taken along the line V—V in FIG. 4.

When the solenoid valve is connected in the pneumatic circuit, the compressed air enters through the duct 9, maintains the chamber 12 under pressure and acts on the plates 34 to induce each disc 42 to seal against the mount of the corresponding duct 111, thereby keeping the solenoid valve automatically closed, as indicated in FIGS. 4 and 6.

By selectively energizing coil 22 of one or more electromagnets 117, the respective core 19 attracts the corresponding plate 34 which pivots upwards about the ring 145 and bears against the air-gap layer 33. The corresponding duct 111 of the solenoid valve is thus opened and the flow of air under pressure entering via the duct 9 flows about the coils 22 and leaves via the open duct 111, which are automatically ventilated as seen for the embodiment of FIG. 1. When a coil 22 ceases to be energized, the corresponding duct 111 of the solenoid valve is rapidly closed without the aid of return means or forces.

Obviously by selectively energizing the various coils 22 it is possible for the various consuming appliances to be operated independently, while the air flow rate at the inlet duct 9 of the solenoid valve varies as a function of the number of coils 22 energized.

It is evident that by uniting the various outlet apertures 111 of the body 107 in FIG. 4 to form a single common duct for a single consuming appliance, it is possible to effect a variation in the flow rate of the solenoid valve at the common outlet duct, either continuously or intermittently. For this purpose, according to the embodiment of the solenoid valve illustrated in FIGS. 7-9, the body 5 is provided with an interchangeable shell, generally designated 51, which has a substantially funnel-shaped chamber 52. This chamber 52 terminates in a common outlet aperture 53 having a threaded end for connection to the consuming appliance.

In particular, in this second embodiment the member carrying the inlet duct 9 and the electromagnets 117 is identical to that in FIG. 4. The member of the body 5 which carries the outlet duct 53 (FIG. 7) comprises, in addition to the shell 51, a disc 55 which is provided with eight outlet ducts 54. The disc 55 may be composed of plastics material and is secured to the inside of the shell 51 by means of a set of screws 56, for example, three in number, a seal 57 being interposed in an annular recess 58 of the shell 51.

In turn the shell 51 mates with the member 6 along the plane 8 and is provided with a groove 59 (see also FIGS. 8 and 9), which accommodates the seal 15. The shell 51 with the disc 55 having the outlet ducts 54 is clamped to the member 6 by means of the resilient band 16. However, it is evident that, here too, the chamber 12 is formed by the space enclosed between the member 6 and the disc 55 provided with the outlet ducts 54.

The disc 55 is provided with an annular recess 146 which enbraces all the outlet ducts 54 and in which is inserted a ring seal 147 of elastomeric material. The seal 147 is provided with a series of holes 148 of a diameter substantially equal to that of the ducts 54. The seal 147 is fastened in the recess 146, for example, by adhesive, so as to prevent the holes 148 becoming offset with respect to the ducts 54.

Finally, the disc 51 is provided with two sets of concentric projections 60, 61 (FIGS. 8 and 9) intended to guide the armatures of the electromagnets 117. Each armature is formed by a plate 34' slightly different from the plate 34, but also formed symmetrically with respect to a plane 35'. It is applied by an edge 36' against a ring 145' of elastic material accommodated in an annular groove 62 of the disc 55. However, each plate 34' additionally has a projection 39' which extends over more than half of a corresponding sealing disc 149 secured to the plate 34', thereby further reducing the mass of the moving element of the electromagnet 117.

The sealing disc 149 is composed of rigid material similarly to the disc 49 of FIG. 3, and is provided with an annular projection 150 of larger diameter than that of the corresponding hole 148 of the seal 147.

When the coil 22 is de-energized, the corresponding plate 34' moves from the position indicated by dashed lines in FIG. 9 into the position indicated by solid lines. It thus induces the corresponding disc 49 to be applied against the seal 147 and, by means of the projection 150, causes the seal to deform concentrically around the corresponding hole 148, thereby fluid-tightly closing the outlet duct 54.

Therefore, it is evident that by simultaneously energizing a variable number of coils 22 a corresponding number of ducts 54 are opened, whereby the flow rate of air in the common outlet aperture 53 can be varied correspondingly. As already indicated, the shell 51 is interchangeable. It may adopt various forms so as to have at least one common outlet aperture 53, into which the air originating from at least one set of outlet ducts 54 of the disc 55 is directed. In FIG. 10 the assembly 63 represents the shell 51 of FIG. 7, in which all the outlet ducts 54 open into a single funnel-shaped chamber 52 which directs the air in the single common aperture 53. The assembly 64 represents another shell 51 provided with four funnel-shaped chambers 52 for four outlet apertures 53: one aperture 53a in which is directed the air of a single duct 54, one aperture 53b in which is directed the air of three ducts 54 and two apertures 53c and 53d in each of which is directed the air of two ducts 54. Obviously, the ducts 54 directed to the same outlet aperture 53 can be opened simultaneously, individually or in combination, thereby also varying the flow rate of each aperture 53.

Figure 7:
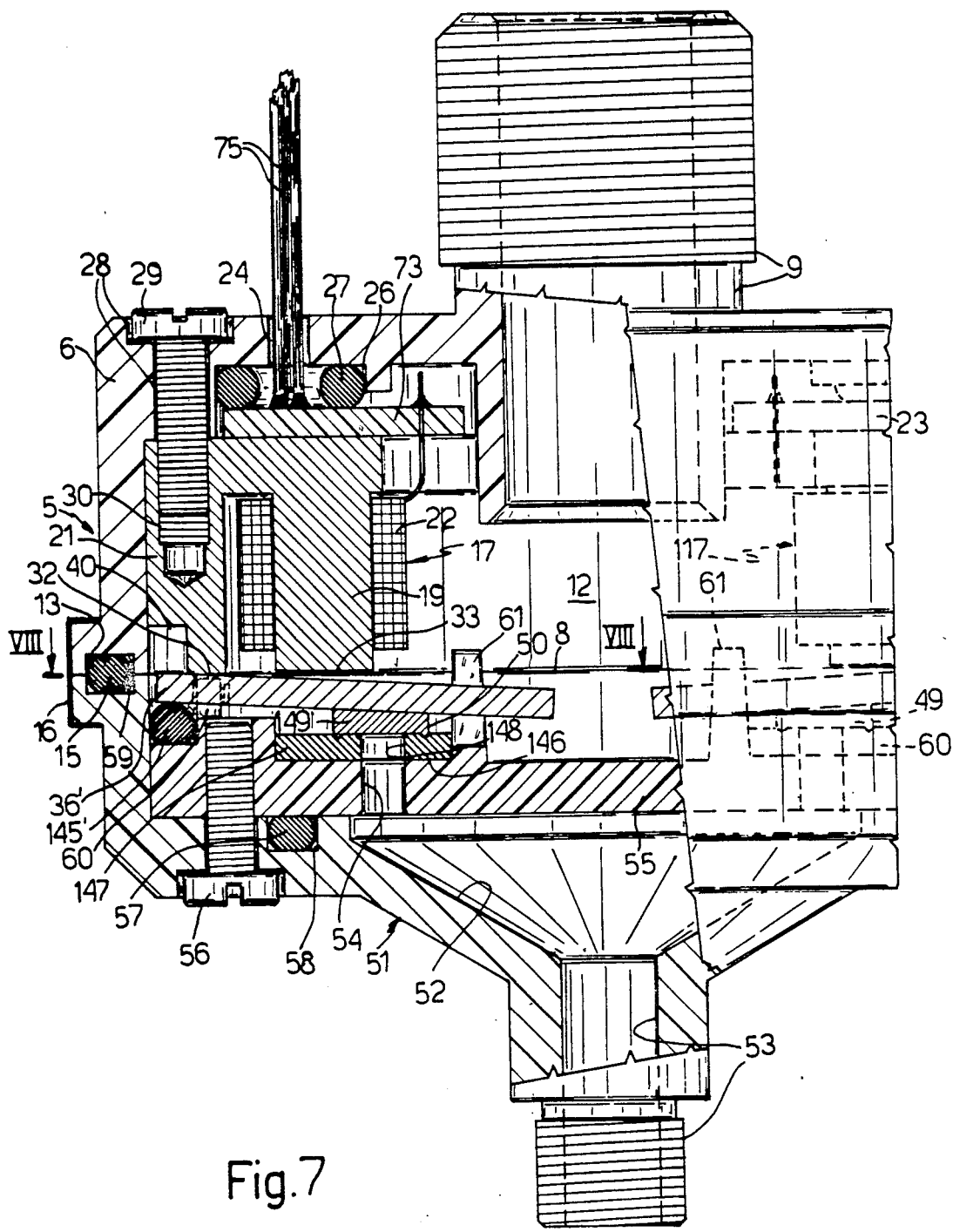
FIG. 7 is partial cross section through a solenoid valve according to another embodiment of the invention.

The solenoid valve in FIG. 7, can also be provided with other shells of differing arrangement of funnel-shaped chambers 52, and even with a shell 51 having eight outlet ducts, thereby providing the arrangement and performance of the solenoid valve in FIG. 4.

It is evident from the foregoing that the flow rate of the solenoid valve can be varied both continuously and intermittenly, in each case the flow rate being in proportion of the number of electromagnets 117 energized for each outlet aperture 53, which can be selected at will. It is also apparent that the modular nature of the elements and possibility of interchanging the shell 51 with the outlet apertures 53 makes it possible to reduce to a minimum the number of components, the assembly operations and thus the costs. Finally, this modular nature and interchangeability firstly makes its possible to provide solenoid valves of reduced dimensions and, secondly, makes readily possible the provision of solenoid valves having a different number of actuators and, therefore, maximum versatility of use.

Of course, various other modifications and improvements could be made to the solenoid valves described without departing from the scope of the claims. For example, the plates 34 and 34' can be pivoted on rigid pins instead of on an elastic ring. In addition, the body 5 of the solenoid valve can be of rectangular or square internal and/or external section. As for the plates 34, with the elastic discs 42 co-operating with the projection 43 of the apertures 11, 111 in FIGS. 1 and 4 they can be replaced by the plates 34' with the rigid discs cooperating with the seal of the type used in the embodiment of FIGS. 3 and 9, and vice versa. Also, all the magnetic circuits of the electromagnets 117 of FIGS. 4 and 7 could be produced in a single casting, thus allowing combined fastening to the member 6 by means of just two screws 29. Finally, the solenoid valve may also be used in hydraulic circuits as well as in pneumatic circuits.

I claim:

1. A high speed solenoid valve for a fluid under pressure, e.g. for pneumatic circuits, comprising first and second coaxial members made of non-magnetic material for forming a body and defining a chamber for the fluid under pressure, an inlet duct for the fluid carried by said first member, at least one outlet duct for the fluid carried by said second member, said inlet duct and said outlet duct opening into said chamber and being disposed with their axes parallel to the axes of said first and second members, a shut-off disc for the fluid in said outlet duct, and an electromagnet arranged in said chamber for controlling said disc, said electromagnet comprising a magnetic circuit and a magnetic coil wound around an axis parallel to said axes, said magnetic circuit and said coil being both secured to said first member and both constantly lapped by the fluid under pressure, said electromagnet further comprising an armature plate pivoting about an axis perpendicular to the axis of said outlet duct, said disc being secured to a surface of said plate facing toward said outlet duct, the arrangement of said plate being such that said disc is maintained in the closed configuration of said outlet duct solely by the fluid pressure.

2. A solenoid valve according to claim 1, wherein the magnetic circuit of said electromagnet comprises a portion outside said coil and constantly in contact with said plate, said plate additionally being applied firmly against a second portion of the magnetic circuit inside said coil when the latter is energized.

3. A solenoid valve according to claim 1, wherein said disc is of wedge-shaped section so as be applied firmly against the mouth of said outlet duct when said coil is de-energized.

4. A solenoid valve according to claim 3, characterised in that the mouth of said outlet duct (11, 54) has a recess (46, 146), for a sealing member (47, 147) composed of elastomeric material having a hole (48, 148) coaxial with said outlet duct (11, 54) said disc (49, 149) consisting of rigid material and being provided with an annular projection (50, 150) able to engage and deform said sealing member concentrically with said hole when said coil (22) is de-energised.

5. A solenoid valve according to claim 2, wherein said second portion of the magnetic circuit is covered with a layer of non-magnetic material so as to provide a minimum air gap for said plate.

6. A solenoid valve according to claim 1, characterised in that said body (5) is provided with a plurality of said outlet ducts (111, 54) associated with a plurality of said shut-off members (34, 34'), said chamber (12) housing a plurality of said electromagnets (117) associated with said shut-off members (34, 34') and energisable individually or in combination to operate said associated shut-off members.

7. A solenoid valve according to claim 1, characterised in that said chamber (12) is formed by said two members (6; 107, 51-55) and is circular in section, said inlet duct (9) being coaxial with said chamber (12), and said outlet ducts (111, 54) being similar to one another and disposed on the other (107, 51-55) of said members along a circle coaxial therewith.

8. A solenoid valve according to claim 7, characterised in that the coils (22) of said electromagnets (117) are disposed with their axes on a circle coaxial with said chamber (12), said shut-off members being formed of plates (34, 34') similar to one another and disposed radially on said other member (107, 51-55).

9. A solenoid valve according to claim 4, characterised in that in register with said outlet ducts (54) said other member (55) has an annular sealing member (147) of elastomeric material and provided with a hole (148) in register with each of said outlet apertures, each of said discs (149) being of rigid material and being provided with an annular projection (150) intended to deform said sealing member concentrically with the respective hole (148) when the corresponding coil (22) is de-energised, so as to effect a seal at the corresponding outlet aperture.

10. A solenoid valve according to claim 1, characterised in that said other member (51, 55) comprises a disc (55) provided with said outlet ducts (54) and said plates (34'), and an interchangeable shell (51) connected to said disc (55) and forming a substantially funnel-shaped chamber (52) to direct the fluid emerging from at least one set of outlet apertures (54) into a common outlet passage (53).

11. A solenoid valve according to claim 10, characterised in that said shell (51) forms a number of collecting chambers (52) and has a corresponding number of outlet passages (53), each collecting chamber (52) being intended to direct to the corresponding outlet passage (53) the fluid emerging from a corresponding set of outlet ducts (54).

12. A solenoid valve according to claim 10, characterised in that said shell (51) comprises a single collecting chamber (52) and a single outlet passage (53) for directing to this latter the fluid emerging from the outlet ducts (54) corresponding to the intermittently energised electromagnets (117).

13. A solenoid valve according to claim 1, further comprising an annular rigid projecting element and an elastomeric material sealing element adapted to be compressed and deformed by said projecting element when said coil is de-energized, one of said elements being carried by said disc, the other of said elements being carried by the mouth of said outlet duct.

14. A high speed solenoid valve for a fluid under pressure, e.g. for pneumatic circuits, comprising first and second members of non-magnetic material for forming a body and defining a chamber, an inlet duct for the fluid carried by said first member, at least one outlet duct for the fluid carried by said second member, said inlet duct and said outlet duct opening into said chamber, a shut-off disc for the fluid in said outlet duct, and an electromagnet arranged in said chamber for controlling said disc, said electromagnet comprises a magnetic coil and a magnetic circuit beoth secured to said first member and constantly acted upon by the fluid under pressure, said electromagnet further comprising an armature plate maintained in contact with a pivot member perpendicular to the axis of said outlet duct, said disc being secured to a surface of said plate facing toward said outlet duct, whereby said fluid under pressure normally maintains said plate with said disc in the closed configuration of said outlet duct, said plate being guided by at least one pair of projections provided on said second member, said pivot member being made of elastomeric material and of circular section and being accommodated in an arcuate groove in said second member.

15. A solenoid valve according to claim 14 characterised in that said paltes (34, 34') are applied by an edge (36, 36') against a single ring (145, 145') of elastomeric material and serving as a pivot.

16. A high speed solenoid valve for a fluid under pressure, e.g. for pneumatic circuits, comprising a body defining a chamber, an inlet duct for the fluid, at least one outlet duct for the fluid, said inlet duct and said outlet duct opening into said chamber, a shut-off disc for the fluid in said outlet duct, and an electromagnet arranged in said chamber for controlling said disc, said electromagnet including a magnetic coil and a magnetic circuit both constantly acted upon by the fluid under pressure, said electromagnet further including an armature plate pivoting about an axis perpendicular to the axis of said outlet duct, said disc being secured to a surface of said plate facing toward said outlet duct, whereby said fluid under pressure normally maintains said plate with said disc in the closed configuration of said outlet duct, the mouth of said outlet disc having a circular projection, said disc having a wedge-shaped section and consisting of an elastomeric sealing material which is applied firmly against said mouth and deformed by said projection when said coil is de-energized.

17. A high speed solenoid valve for a fluid under pressure, e.g. for pneumatic circuits, comprising first and second coaxial members of non-magnetic material for forming a body and defining a chamber, the first member being integral with an inlet duct for the fluid, and the second member being integral with at least one outlet duct for the fluid, said inlet duct and said outlet duct opening into said chamber, said ducts being disposed with their axes parallel to the axis of said first and second members, at least one of said ducts being coaxial with said first and second members, a shut-off disc for the fluid in said outlet duct, and an electromagnet arranged in said chamber for controlling said disc, said electromagnet comprising a magnetic coil and a magnetic circuit both secured to said first member and constantly acted upon by the fluid under pressure, said electromagnet further comprising an armature plate maintained in contact with a pivot member perpendicular to the axis of said outlet duct, said disc being secured to a surface of said plate facing toward said outlet duct, whereby said fluid under pressure normally, maintains said plate with said disc in the closed configuration of said outlet duct, said coil being wound around an axis parallel to the axis of said outlet duct, said magnetic circuit comprising a portion outside said coil and constantlly in contact with said plate, said plate additionally being applied against a second portion of said magnetic circuit inside said coil when the latter is energized, said coil being electrically connected to a pair of electrical terminals provided on a printed circuit board secured to said first member, a pair of electric leads passing through a hole in said first member being connected to said board, an element consisting of elastomeric material being inserted between said board and said first member so as to effect a seal between said hole and said chamber.

18. A high speed solenoid valve for a fluid under pressure, e.g. for pneumatic circuits, comprising first and second members of non-magnetic material for forming a body and defining a chamber, an inlet duct for the fluid carried by said first member, at least one outlet duct for the fluid carried by said second member said inlet duct and said outlet duct opening into said chamber, a shut-off disc for the fluid in said outlet duct, and an electromagnet arranged in said chamber for controlling said disc, said electromagnet comprising a magnetic coil and a magnetic circuit both secured to said first member and constantly acted upon by the fluid under pressure, said electromagnet further comprising an armature plate maintained in contact with a pivot member perpendicular to the axis of said outlet duct, said disc being secured to a surface of said plate facing toward said outlet duct, whereby said fluid under pressure normally maintains said plate with said disc in the closed configuration of said outlet duct, said coil being electrically connected to a pair of electrical terminals provided on a printed circuit board secured to said first member, a pair of electric leads passing through a hole in said first member being connected to said board, an element consisting of elastomeric material being inserted between said board and said first member so as to effect a seal between said hole and said chamber.

* * * * *